United States Patent [19]
Duerr

[11] 3,739,572
[45] June 19, 1973

[54] ENGINE TURBOCHARGER DRIVE SYSTEM
[75] Inventor: Bruno A. Duerr, La Grange Park, Ill.
[73] Assignee: General Motors Corporation, Detroit, Mich.
[22] Filed: July 19, 1972
[21] Appl. No.: 273,097

Related U.S. Application Data
[62] Division of Ser. No. 159,210, July 2, 1971.

[52] U.S. Cl. .............................. 60/13, 123/119 CA
[51] Int. Cl. ............................................ F02b 37/04
[58] Field of Search ................ 60/13; 123/119 CA, 123/119 CB; 74/782

[56] References Cited
UNITED STATES PATENTS
| | | | |
|---|---|---|---|
| 2,929,198 | 3/1960 | Crocchi | 123/119 CA |
| 3,080,704 | 3/1963 | Nallinger | 60/13 |
| 3,382,855 | 3/1968 | Glamann | 123/119 C |
| 2,197,179 | 4/1940 | Hersey | 60/13 |
| 2,848,866 | 8/1958 | Geistinger | 60/13 |

Primary Examiner—Carlton R. Croyle
Assistant Examiner—Warren Olsen
Attorney—W. E. Finken and Charles R. White

[57] ABSTRACT

Turbocharger drive having planetary gear units in a gear train between an engine crankshaft and a compressor rotor, which rotates to supply air to an engine for combustion. The reaction member of a planetary unit of the gear train is connected to the pump of a hydrodynamic unit while the turbine member is grounded so that the stall torque of the unit retards rotation of the reaction member to permit the engine crankshaft to drive the rotor through the gear train. The hydrodynamic unit having an infinite number of spring rates provides an infinitely flexible device for reducing transmission of engine torsionals and shock loads through the gear train. The mechanical drive is assisted by a gas drive from the engine exhaust which progressively increases as the engine approaches full load and the rotor becomes fully driven by the engine exhaust gases. When the gas drive speed and load equals the rotor needs, the mechanical system reaches a no-load condition.

5 Claims, 1 Drawing Figure

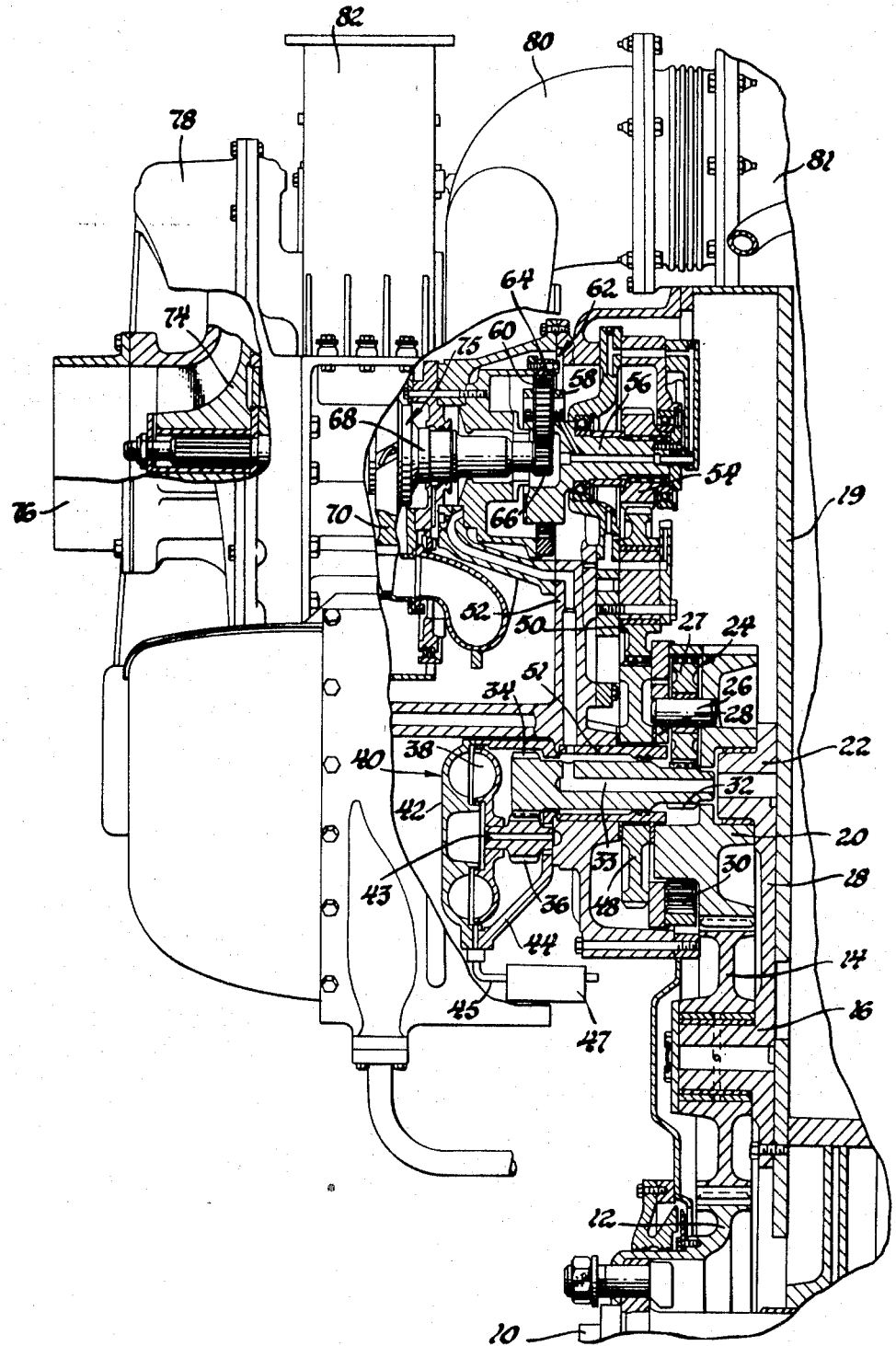

ENGINE TURBOCHARGER DRIVE SYSTEM

This is a division of application of Ser. No. 159,210 filed July 2, 1971.

This invention relates to an engine turbocharger drive system and more particularly to a power transmission in a turbocharger providing for the one-way transmission of power between an engine crankshaft and a rotor unit of the turbocharger.

Prior to the present invention, engine turbocharger drive systems have incorporated planetary gearing and a cooperating one-way clutch to permit the engine crankshaft to drive a turbocharger rotor unit comprising a turbine wheel and connected air compressor impeller. These clutches are generally of the ratchet or roller type and are effective to permit the crankshaft to drive the rotor unit until the energy from the engine exhaust converted by the turbine wheel drives the rotor unit without the aid of the gear train. When this occurs, the one-way clutch disengages to permit the rotor unit to overrun the drive from the crankshaft. While these prior gear trains have been quite satisfactory, the one-way clutches are subjected to severe loading and wear because of transmission of engine and output shaft torsionals through the gearing.

In the present invention the stall torque of a fluid unit such as that of a torque converter or fluid coupling is employed to retard rotation of a reaction member of a planetary gear unit forming part of the gear train between the engine crankshaft and a rotor unit in a turbocharger. This permits the engine torque to be mechanically supplied to drive the air compressor rotor unit with a small percentage of torque being passed to the fluid unit. The engine turbocharger drive system of this invention further permits the rotor unit to overrun the mechanical drive from the engine crankshaft without the employment of prior one-way clutching mechanisms and the slip characteristics of the fluid unit can be used to limit the rotor over-speed. The employment of a fluid unit in the present system as a reaction member divides the system into two parts without the use of prior one-way clutches and provides an infinitely flexible reaction member to reduce the transmission of engine torsionals. Also, shock loads such as those occurring when there is abrupt transfer of the drive from the rotor unit to the gear train are absorbed without undue strain on the gearing. When the engine is under a no-load condition as when idling, the fluid unit slippage absorbs part of the torque so that the drive torque for the turbine wheel is reduced thereby reducing the output of the compressor impeller which decreases fuel consumption and extends gear train life. With this system the hydraulic unit can be employed in a position outside of the turbo assembly housing in a convenient place for servicing.

The gear train of this invention preferably has a gear ratio which is optimized to take advantage of slip in the hydrodynamic unit to simulate the clutch overrun, however, the fluid in the unit can be dumped for overrun, if desired. Also, a small one-way clutch can readily be used between the reaction gear of the planetary unit and the pump of the hydrodynamic unit or between the turbine of the hydrodynamic unit and ground to permit the overrun of the rotor unit.

These and other features, objects and advantages of this invention will become more apparent from the following detailed description and drawing in which:

The FIGURE shows a side view partly in section of an engine turbocharger drive system.

As shown in the FIGURE there is a crankshaft 10 of a diesel or other combustion engine having a crankshaft gear 12 that meshes with and drives an idler gear 14. This idler gear is rotatably mounted on a stub shaft 16 extending from a stationary plate 18 that is secured by bolts to the end plate 19 of the engine crankcase. Idler gear 14 meshes with and drives an idler gear 20 rotatably mounted on stub shaft 22 extending from end plate 18. This latter idler gear is drivingly connected to a planetary gearset 24 preferably by connecting the pivot shafts 26 of planet gears 27, which extend from carrier 28 to the web of the idler. The planet gears 27 mesh with a ring gear 30 and a sun gear 32 of the planetary gearset 24. The sun gear 32 is disposed at one end of an axially extending shaft 33, which has at the other end a spur gear 34, which meshes with a spur gear 36 that is drivingly connected to the pump 38 of a fluid unit 40, which in the preferred embodiment, is a fluid coupling. The fluid unit has a turbine 42 fixed to a stationary housing 44. When operating, the fluid unit is supplied with three to four gallons of engine oil per minute through a supply passage 43 and the oil exiting from this coupling is fed by passage 45 to a cooler 47 and then to a sump, not shown.

The ring gear 30 of the planetary gearset 24 is drivingly connected to a turbocharger drive gear 48, which meshes with and drives an idler gear 50. As shown, gear 48 is mounted on a sleeve 51 supported in housing 52 while idler gear 50 is rotatably mounted in housing 52 and meshes with a carrier drive gear 54, which is splined to a shaft 56. This shaft is drivingly connected to a carrier 58 for the planet gears 60 of a speed-increasing planetary gearset 62. The planetary gears 60 are mounted on pivot pins extending from the carrier. These gears mesh with a stationary ring gear 64 and a rotatable sun gear 66. The sun gear, providing an output of this planetary gearset, is fixed on one end of a shaft 68 which is drivingly connected to a bladed turbine wheel 70 and a bladed impeller 74 which form a rotor unit 75. Air is taken into the compressor housing through air inlet 76 and compressed by the rotating impeller and supplied through discharge scroll 78 through suitable ducts to the engine induction system. In addition to the drive from the gear train described above, the bladed turbine wheel 70 and connected impeller can be driven by the hot exhaust gases from the engine supplied to the turbine inlet scroll 80 through engine exhaust manifold 81. Engine exhaust gases fed to the bladed turbine wheel 70 are exhausted through the exhaust duct 82.

To provide the necessary air for combustion for engine starting, light load operation and rapid acceleration, the rotor unit with the air compressor impeller 74 is primarily driven by the engine crankshaft 10 through the gear train and secondarily driven by the engine exhaust supplied to the turbine wheel 70 through the inlet scroll 80.

When the engine is driving under these operating conditions, the planetary gearset 24 is conditioned for overdrive operation; carrier 28 being driven by the crankshaft 10 through idler gears 14 and 20 with the speed of the reaction sun gear 32 fixed by the stall torque of the fluid coupling 40. The stall torque rapidly increases with increasing speed and slip of pump 38. The ring gear 30 of the planetary gearset 24 provides an output to drive the connected turbocharger drive gear 48 with increased speed and decreased torque as compared to the speed and torque of carrier 28.

The turbocharger drive gear 48 drives the idler gear 50 and the meshing carrier drive gear 54 which in turn drives the shaft 56 and connected carrier 58 of the planetary gearset 62. This planetary gearset is also conditioned for an overdrive operation since the ring gear 64 is held for reaction. Under these conditions the sun gear 66 is driven at a speed faster than the input provided by carrier 58. The turbine shaft 68 with the turbine wheel 70 and impeller 74 connected thereto are driven as a rotor unit by the sun gear. The air compressor impeller is thus driven by the engine at increased speed through the gear train as determined by the ratios of the two overdrive planetary units to supply sufficient quantities of air to the engine for combustion.

When the engine approaches full load, the exhaust gases acting on the turbine wheel drive the rotor unit faster than the mechanical input. Under these conditions, the direction of torque in the portion of the gear train from the carrier 58 of gear unit 62 to the ring gear 30 of planetary gear unit 24 is reversed. The torque on the sun gear 32 is in a forward direction from carrier 28 and in a reverse direction from the ring gear 30. The gear ratio of the planetary gearsets are selected so the torques on the sun gear 32 will be substantially cancelled when the turbine wheel is driving. Thus, the fluid unit 40 operates to divide the drive train into two separated parts so that the natural frequency of the system is not fixed and cannot be excitable by the engine. The transmission of engine and output shaft torsionals will be substantially reduced as compared to prior systems by increased coupling slip to thereby prevent undue strain on the gear train. Coupling slip also prevents an overload on the gear train when the turbine drive suddenly drops the load on the gear train as when the engine load is dumped.

When the engine is driving the rotor unit for engine starting and light load operation, the coupling slip absorbs approximately 10 percent of the torque supplied by the engine to the gear train. This absorption of torque reduces air flow to the engine under no-load conditions and there will be less turbine assistance so that the reduction in compressor power provides for decreased fuel consumption and longer gear train life.

The coupling is disposed in a position in the turbocharger assembly for accessibility for quick inspection and repair if needed. With this system the prior one-way clutch has been eliminated although a small one-way device could be employed between sun gear 32 and spur gear 34 if desired or between the turbine 42 and ground to provide for the overrun of the rotor unit. Overrun could also be accomplished by cutting off the supply of oil to the coupling through passage 43 and replaced by air so that the oil in the coupling will be evacuated through passage 43. With the coupling emptied of drive oil, there would be no drive between the pump and turbine and the pump would be free to spin. Instead of a fluid coupling, a hydrodynamic torque converter could readily be used as the fluid unit.

This invention is not limited to the details of the construction shown and described for purposes of illustrating the invention for other modifications will occur to those skilled in the art.

I claim:

1. In a turbocharger for a combustion engine for increasing engine horsepower and fuel economy by the utilization of engine exhaust gases, an engine having a crankshaft and an engine exhaust gas passage and an inlet air passage, a rotatable turbine adapted to be driven by the exhaust gasses of said engine, an air compressor impeller operatively connected to said turbine wheel and operatively disposed in said inlet air supply conduit for supplying air to the combustion chamber of the engine, gear train means operatively connecting said engine crankshaft to said impeller so that said engine can mechanically drive said impeller to a predetermined speed when there is insufficient energy in the exhaust gas from said engine to drive the turbine wheel and connected impeller alone, said gear train means having a planetary gearset with planet gear members drivingly connecting sun gear and ring gear members and having a carrier for said planetary members, a hydrodynamic unit having a first vaned rotor member operatively connected to one of said planetary members and a second vaned member disposed adjacent to said first rotor member, means for holding said second vaned member stationary so that the stall torque of said hydrodynamic unit which increases with increasing speed of said first rotor member retards rotation of one of said planetary members to thereby condition said planetary gearset for torque transmittal to thereby mechanically drive said turbine and said impeller, and said turbine being operatively disposed within said exhaust gas passage from said engine and adapted to be driven by the exhaust gasses of said engine in conjunction with said mechanical drive and by said exhaust gasses alone with said fluid unit providing for an overrun of said mechanical drive from said engine by said turbine to thereby prevent the driving of said engine crankshaft by said turbine.

2. In combination, a combustion engine having a crankshaft, an engine exhaust manifold and air intake means; a turbocharger for supplying air to said engine for combustion of fuel supplied thereto, said turbocharger comprising a housing having an air inlet operatively connected to the air intake of said engine, an impeller operatively disposed in said housing for forcing air from said air inlet into said engine, a drive shaft operatively connected to said impeller, exhaust gas passage means operatively connected to said engine exhaust manifold, bladed turbine means disposed in said exhaust passage means operatively connected to said drive shaft for driving said impeller; a gear train operatively connecting said crankshaft to said drive shaft, said gear train comprising a planetary gear unit having input means drivingly connected to said crankshaft and having output means drivingly connected to said drive shaft, said planetary unit having a reaction member, and a fluid coupling having a pump operatively connected to said reaction member to condition said planetary gear unit for predetermined speed ratio to permit said crankshaft to drive said impeller until the energy in the gas exhausted from said engine solely drives said bladed turbine means and said impeller connected thereto.

3. In combination a combustion engine having a crankshaft, an engine exhaust manifold and air induction means; a turbocharger for supplying air to said engine for the combustion of the fuel supplied to said engine, said turbocharger comprising a housing having an air inlet operatively connected to said engine, an impeller operatively disposed in said housing and rotatably mounted therein for forcing air from said inlet into said engine, a drive shaft operatively connected to said impeller, exhaust passage means operatively connected to said engine exhaust manifold, a bladed turbine means disposed in said exhaust passage means operatively connected to said drive shaft for absorbing energy from said engine exhaust for driving said impeller, a gear train operatively connecting said crankshaft to said drive shaft, said gear train comprising a planetary gearset having an input means drivingly connected to said crankshaft and having an output means drivingly connected to said drive shaft, a hydrodynamic fluid unit having input and output rotors, means grounding said output rotor, means connecting said input rotor to said reaction member so that the stall torque of said unit retards rotation of said reaction member to condition said planetary gearset for an overdrive ratio to permit said crankshaft to drive said impeller until said engine develops sufficient energy in the exhaust to fully drive said turbine and said impeller.

4. In combination a combustion engine having a crankshaft, an engine exhaust manifold and air induction means; a turbocharger for supplying air to said engine for the combustion of the fuel supplied thereto, said turbocharger comprising a rotor unit having an air impeller and a bladed turbine wheel drivingly connected to each other, a housing for said rotor unit comprising an air intake passage means operatively connected to the air induction means of said engine, support means rotatably mounting said air impeller in said intake passage means to allow said air impeller to force air into said engine, gas exhaust passage means operatively connected to said exhaust manifold, said bladed turbine means being operatively mounted in said exhaust passage means so that said turbine wheel can absorb energy from gas exhausted from said engine to drive said impeller, gear train drivingly connecting said crankshaft to said turbocharger rotor unit, said gear train comprising a planetary gearset having planet gear means drivingly connecting sun gear means and ring gear means and further having carrier means for said planet gear means operatively connected to said crankshaft, a hydrodynamic unit having a pump operatively connected to said sun gear means and having a turbine, means for holding said turbine stationary so that the stall torque of said hydrodynamic unit limits the rotation of said sun gear means in response to the drive of said carrier means by said crankshaft so that said crankshaft drives said turbocharger rotor unit at a rotary speed faster than the rotary speed of said carrier means until the energy in the gas exhaust from said engine is sufficient to solely drive said turbocharger rotor unit.

5. The combination defined in claim 4 wherein said gear train further comprises a second planetary gearset, said second planetary gearset having planet gear means drivingly connecting a sun gear and a ring gear, a carrier for said planet gear means, means for holding said ring gear stationary, means operatively connecting said carrier to said ring gear means of said first mentioned planetary gearset so that said second planetary gearset further increases the speed of said rotor unit when driven by said crankshaft.

* * * * *